United States Patent [19]

Erickson et al.

[11] Patent Number: 5,389,214
[45] Date of Patent: Feb. 14, 1995

[54] FLUID TREATMENT SYSTEM EMPLOYING ELECTRICALLY RECONFIGURABLE ELECTRODE ARRANGEMENT

[75] Inventors: Robert K. Erickson, Belmont; Francois X. Prinz, San Jose, both of Calif.

[73] Assignee: Water Regeneration Systems, Inc., Belmont, Calif.

[21] Appl. No.: 901,376

[22] Filed: Jun. 19, 1992

[51] Int. Cl.⁶ .............................................. C02F 1/461
[52] U.S. Cl. ................................. 204/149; 204/152; 204/228; 204/269; 204/305; 204/400; 204/412
[58] Field of Search ............... 204/149, 152, 228, 305, 204/400, 406, 412, 269

[56] References Cited

U.S. PATENT DOCUMENTS

| | | | |
|---|---|---|---|
| 2,864,750 | 12/1958 | Hughes et al. | 204/149 |
| 3,523,891 | 8/1970 | Mehl | 210/44 |
| 3,691,050 | 9/1972 | Sayre | 204/219 |
| 3,925,176 | 12/1975 | Okert | 204/152 |
| 3,933,606 | 1/1976 | Harms | 204/152 |
| 4,119,520 | 10/1978 | Paschakarnis et al. | 204/276 |
| 4,263,114 | 4/1981 | Shindell | 204/149 |
| 4,306,952 | 12/1981 | Jansen | 204/149 |
| 4,321,125 | 3/1982 | Nazarian et al. | 204/273 |
| 4,461,690 | 7/1984 | Rolff et al. | 204/228 |
| 4,623,436 | 11/1986 | Umehara | 204/149 |
| 4,769,119 | 9/1988 | Grundler | 204/149 |
| 4,842,724 | 6/1989 | Bray et al. | 210/104 |
| 4,986,906 | 1/1991 | Dadisman | 210/169 |
| 5,034,123 | 7/1991 | Tanaka et al. | 210/195.1 |
| 5,049,252 | 9/1991 | Murrell | 204/268 |
| 5,055,170 | 10/1991 | Saito | 204/228 |

FOREIGN PATENT DOCUMENTS

0329562  8/1989  European Pat. Off. .
203896 11/1983  Germany .

*Primary Examiner*—T. Tung
*Assistant Examiner*—Arun S. Phasge
*Attorney, Agent, or Firm*—Christensen, O'Connor, Johnson & Kindness

[57] ABSTRACT

An electrolytic filter system (16) is disclosed for use in treating fluid provided by a fluid source (12) to a supplied environment (14). The system includes an electrolytic cell (18) controlled by control circuit (20). Various alternative constructions of the cell are described in which the effective separation of active electrodes, as well as the effective area of the active electrodes can be altered by a switching circuit (94) and controller (96) included in the control circuit (20). The controller responds to inputs from a current sensor (92) reflecting variations in the resistivity of the water. As a result, the controller is able to alter the effective separation and area of the active electrode, in response to resistivity variations to provide optimal operation.

23 Claims, 11 Drawing Sheets

FLUID TREATMENT SYSTEM EMPLOYING ELECTRICALLY RECONFIGURABLE ELECTRODE ARRANGEMENT

FIELD OF THE INVENTION

This invention relates generally to electrolytic fluid treatment systems and, more particularly, to electrode arrangements used in such systems.

BACKGROUND OF THE INVENTION

Electrolytic fluid treatment systems are widely used to, for example, remove impurities and contaminants from fluids. In such systems, the fluid to be treated is passed between one or more pairs of electrodes. An electric potential applied to the electrodes establishes an electric current between the electrodes. As a result, impurities in the fluid migrate and adhere to the electrodes, biological materials in the fluid are killed, and the fluid's chemical composition may be altered.

One fluid that is commonly processed by electrolytic fluid treatment systems is water. The electrolytic treatment of water is, however, complicated by the widely varying water characteristics encountered from one water source to another. In that regard, the resistivity of water, which is inversely proportional to conductivity, commonly varies over a range extending from 30 to 1400 ohm-meter. Such resistivity variations may significantly alter the performance of an electrolytic filter system.

More particularly, the interelectrode resistance is dependent upon the resistivity of the water flowing between the electrodes. With a fixed electric potential applied to the electrodes, current flow between the electrodes will vary in inverse proportion to the water's resistance. If water resistivity is relatively high, the current may be too low to achieve the desired treatment of the water. On the other hand, if water resistivity is relatively low, the current may be so high as to damage or otherwise decrease the life of system components.

A variety of different systems have been developed that attempt to accommodate such variations in water resistivity. For example, electronic control circuits have been designed to allow water purification and ion generation systems to maintain constant current flows, substantially independent of variations in water resistivity.

In that regard, U.S. Pat. No. 4,119,520 (Paschakarnis et al.) discloses a water purification unit that includes such a current control circuit. The current to be controlled flows through a resistor, as well as between the electrodes. A differential amplifier and transistor cooperatively control the current by keeping the voltage drop across the resistor equal to the reference potential across a diode. As a result, the current flowing between the electrodes is kept constant.

Similarly, U.S. Pat. No. 5,055,170 (Saito) discloses an ionic water generator that accounts for variations in water resistivity. The Saito system employs a central processing unit that calculates the appropriate voltage to be applied to the electrodes for the water being processed. This voltage is computed by multiplying some voltage corresponding to the desired ion concentration by a factor equal to the resistance of the water actually being processed divided by the resistance of some reference water.

As will be appreciated, the Paschakarnis et al. and Saito systems exhibit several shortcomings. First, the control circuits of both systems are relatively complex. Because the Paschakarnis et al. circuit introduces an additional resistance into the current path, it is also relatively inefficient. The Saito circuit, in turn, disadvantageously requires reference measurements to be made for subsequent use in controlling the voltage applied to the electrodes.

An alternative method of handling variations in water conductivity is to ensure that the system is exposed to a relatively constant load resistance, regardless of variations in water resistivity. U.S. Pat. No. 4,769,119 (Grundler) discloses a water ionizing device, including several electrodes, that employs this approach. If the resistivity of the water being ionized is relatively low, a relatively high resistance is introduced in series with the electrodes. On the other hand, if the water's resistivity is relatively high, a relatively low resistance is introduced in series with the electrodes. In either case, by keeping the system's total resistive load constant, a constant current flow is maintained between the electrodes.

U.S. Pat. No. 4,986,906 (Dadisman) describes another variation of this approach. The Dadisman water purification system includes a constant current control circuit in which changes in water resistance cause opposing changes in the effective resistance of a field-effect transistor (FET) included in the circuit. These changes in FET resistance offset the changes in water resistance, allowing the current to be kept substantially constant.

The Grundler and Dadisman systems also have certain limitations. More particularly, the Grundler and Dadisman circuits both increase circuit resistance to offset decreases in water resistance. As a result, energy is dissipated in circuit components rather than being used to filter water, making the circuit relatively inefficient. In addition, the Grundler and Dadisman circuits are also both relatively complex.

Yet another technique proposed to handle variations in water resistivity is described in U.S. Pat. No. 3,691,050 (Sayre). The Sayre water treatment cell includes electrodes whose separation is mechanically adjustable. If the cell is to be used with water having a relatively high resistivity, the operator physically adjusts the electrodes so that they are closer together. Alternatively, if the system is to be used with water having a relatively low resistivity, the operator adjusts the electrodes so that they are more widely spaced. In either event, the interelectrode resistance is kept uniform, ensuring a constant current flow.

As will be appreciated, the Sayre system has several shortcomings. First, the operator is required to make independent assessments of the water's resistivity. In addition, the system is relatively complicated and the necessary adjustments are relatively time consuming to perform. Finally, because the system does not automatically respond to variations in water resistivity, it may fail to achieve the desired regulation in many instances.

As will be appreciated from the foregoing remarks, it would be desirable to provide a electrolytic filter system that is substantially free from the influence of water resistivity variations, while remaining relatively efficient, simple, and easy to operate.

SUMMARY OF THE INVENTION

In accordance with this invention, an electrolytic fluid treatment system is described for treating a fluid. The filter system includes a plurality of electrodes and a support structure for physically supporting the electrodes. An electrical reconfiguration circuit is included for providing electrically reconfigurable connections to the plurality of electrodes. The system also includes a sensor for producing an output representative of the resistivity of the fluid. The reconfiguration circuit provides the electrically reconfigurable connections to the plurality of electrodes in response to the sensor's output.

In accordance with an additional aspect of this invention, the reconfiguration circuit is for electrically connecting different electrodes for use as anodes and cathodes when the sensor output is representative of a fluid resistivity above some threshold level. The circuit may reconfigure the connections of selected electrodes for use as charged and uncharged electrodes and for reconfiguring the connections of charged electrodes for use as anodes and cathodes when the output is representative of a fluid resistivity below some threshold. The circuit may also reconfigure the connections of eight adjacent electrodes for use as an anode, neutral electrode, neutral electrode, neutral electrode, cathode, neutral electrode, neutral electrode, and neutral electrode, respectively, when the output is representative of a fluid resistivity below some threshold.

In accordance with another aspect of the invention, a method is disclosed of electrolytically treating a fluid, that is responsive to variations in the resistivity of the fluid. The method includes the steps of evaluating the resistivity of the fluid to be treated and electrically connecting a plurality of electrodes together in a particular configuration responsive to the evaluated resistivity of the fluid.

In accordance with an additional aspect of this invention, an electrolytic filter system for filtering a fluid is disclosed. In one arrangement, the system includes a plurality of electrodes physically supported relative to one another and a circuit for electrically connecting the electrodes to define one or more active electrodes whose effective separation is dependent upon the resistivity of the fluid. In another arrangement, the system includes a plurality of electrodes, each of which includes a plurality of individual elements, and a circuit for electrically connecting the electrode elements to define one or more active electrodes whose effective area is dependent upon the resistivity of the fluid.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
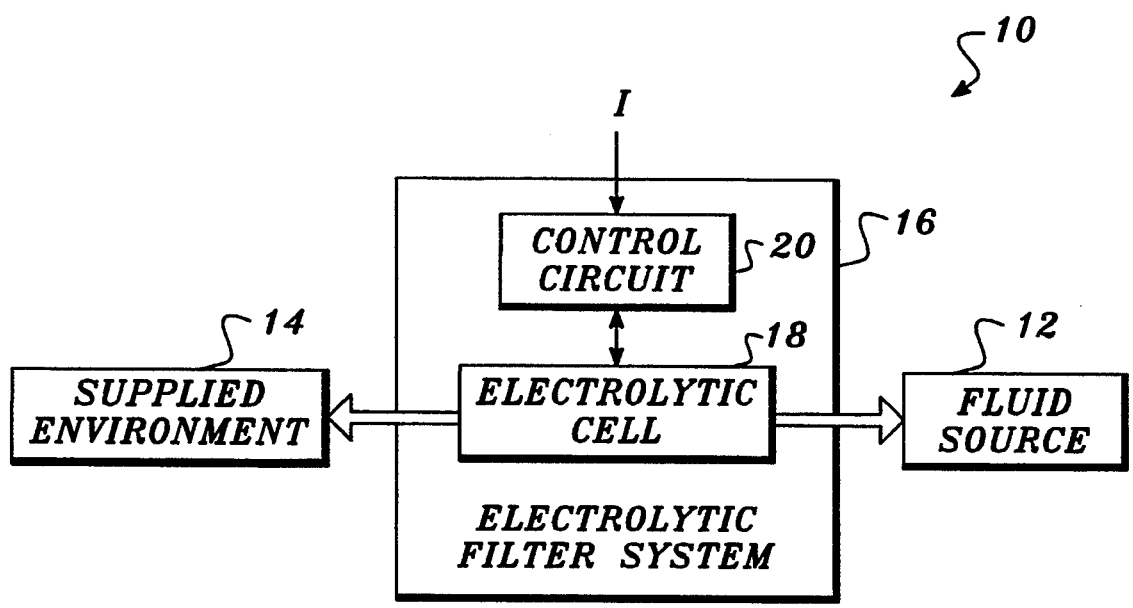
FIG. 1 is a block diagram of an electrolytic filter system constructed in accordance with the present invention.

Referring now to FIG. 1, a fluid system 10 constructed in accordance with the invention is depicted. Fluid system 10 includes a fluid source 12 that provides fluid to a supplied environment 14 via an electrolytic fluid treatment system, such as filter system 16. As will be described in greater detail below, the electrolytic filter system 16 is designed to remove contaminants and impurities from the fluid in an efficient and effective manner that is not adversely impacted by variations in the fluid's resistivity.

Before discussing the construction and operation of system 10 in greater detail, the physics involved will be briefly reviewed. In that regard, conventional electrolytic filter systems pass electric current between at least one pair of electrodes to effect the desired filtration of fluids located between the electrodes. The ability of the system to cause impurities to migrate to the electrodes, kill biological material, and alter the chemical composition of the fluids depends, in part, upon the magnitude of the current flow between the electrodes.

Assuming that a fixed voltage V is applied across two electrodes, the magnitude of the current I flowing between the electrodes varies substantially in accordance with the expression:

$$I = V/R \tag{1}$$

where R is the resistance of the fluid between the electrodes. The resistance R of the fluid can be determined in accordance with the expression:

$$R = \rho L/A \tag{2}$$

where $\rho$ is the resistivity of the fluid, L is the separation of the two electrodes, and A is the cross-sectional area of the fluid path between the electrodes. The resistivity $\rho$, in turn, varies in accordance with the expression:

$$\rho = \rho_0[1 + \alpha(T - T_0)] \tag{3}$$

where $\rho_0$ is the resistivity of the fluid at some temperature $T_0$, T is the actual temperature of the fluid and $\alpha$ is a temperature coefficient. As a result, the resistivity and, hence, resistance of the fluid defining the current path between electrodes changes in response to both fluid and temperature fluctuations.

With a fixed voltage applied between the two electrodes, the magnitude of the current I flowing therebetween thus depends upon the fluid resistance R. As noted previously, the resistivity p (and its reciprocal, conductivity $\sigma$) of the fluid may vary considerably with time. These variations may be attributable to differences in the composition of the fluid as well as its temperature. In any event, such changes alter the interelectrode resistance R and current I and potentially impact the filter's effectiveness.

As will be described in greater detail below, by altering the effective separation L of the electrodes and/or the cross-sectional area A of the fluid flow path, these variations in resistivity can be accommodated to maintain a relatively constant interelectrode resistance and current. The embodiments of the electrolytic filter system 16 described below achieve the desired corrections in these alternative manners.

Addressing now the construction of the various components of system 10 individually, the fluid source 12 may take any of a variety of forms. Typically, the fluid source 12 will include a fluid supply or reservoir, as well as some arrangement for providing fluid to the filter system 16 in a controllable and pressurized manner. To that end, the fluid source 12 may include, for example, a pump and various valves.

One common example of a fluid source 12 is a municipal water supply. As will be appreciated, the water available from many such supplies may exhibit widely varying characteristics. For example, it is not uncommon for the resistivity of water from different municipalities to range between 30 to 1400 ohm-meter.

Like the fluid source 12, supplied environment 14 may take a variety of different forms. Examples of supplied environments 14 include swimming pools, water heaters, and drinking water dispensers. In some instances, although not shown in FIG. 1, the supplied environment 14 may use the fluid and return it to the source 12 for treatment. In other instances, the supplied environment 14 may represent the ultimate destination of the fluid.

The heart of fluid system 10 is the electrolytic filter system 16. As indicated in FIG. 1, filter system 16 includes an electrolytic cell 18 and control circuit 20. As will be described in greater detail below, the electrolytic cell 18 processes fluid flowing from source 12 to the supplied environment 14. The control circuit 20 provides electrical energy to the cell 18 in a controlled fashion, allowing cell 18 to effect the desired filtration of the fluid substantially independent of variations in fluid resistivity.

Figure 2:
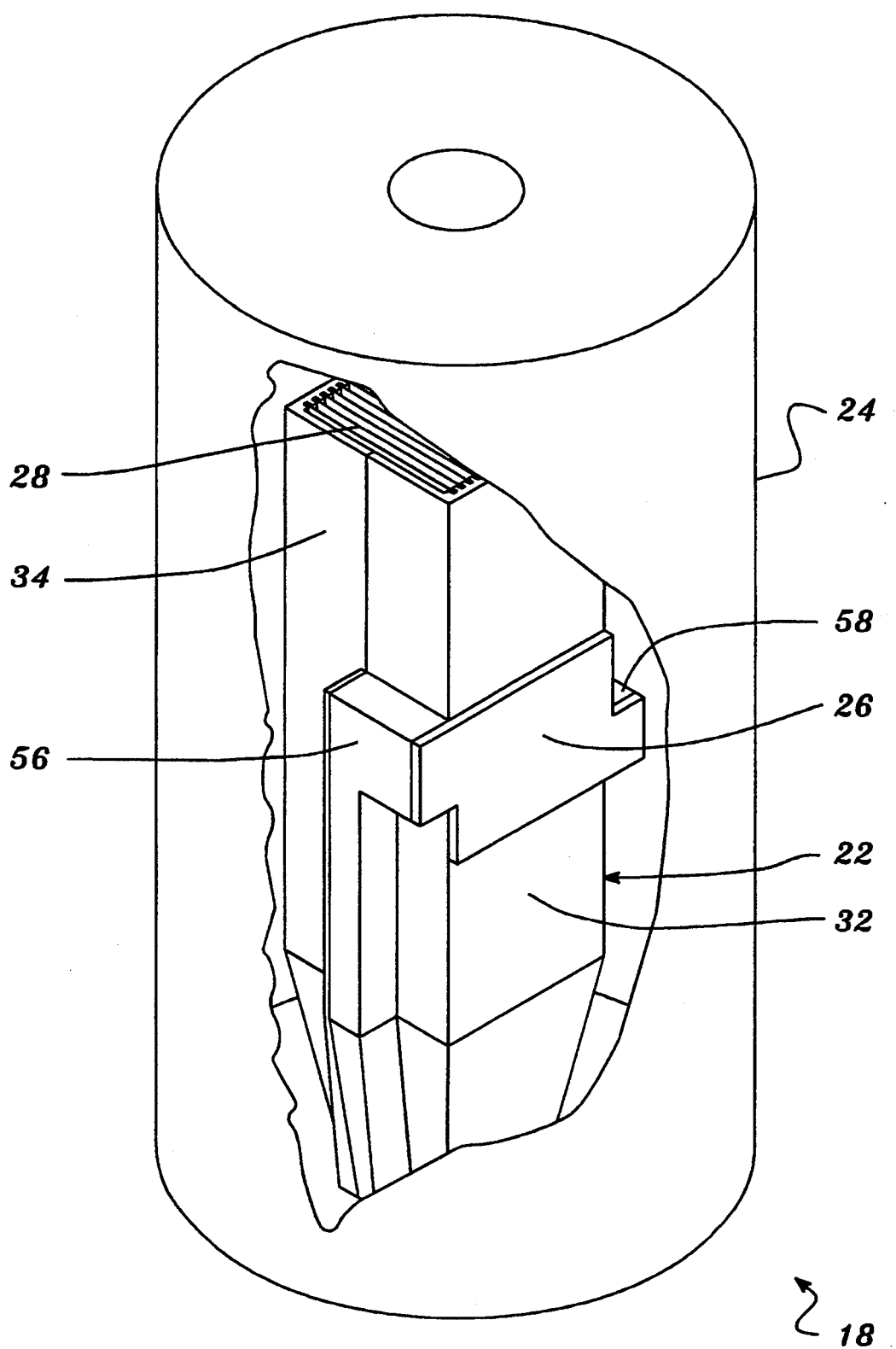
FIG. 2 is an illustration of an electrolytic cell included in the filter system of FIG. 1 and employing a plurality of electrically reconfigurable electrodes.

Reviewing these two primary components of filter system 16 in greater detail, as shown in FIG. 2, the electrolytic cell 18 includes an electrode assembly 22 positioned within a reservoir 24. The electrode assembly 22, which is shown in greater detail in FIG. 3, includes as its primary components a housing 26, a plurality of electrodes 28, and electrical wiring 30. The housing 26 includes a first section 32 and second section 34, which cooperatively define an electrode chamber 36 and inlet chamber 38 therebetween.

Figure 3:
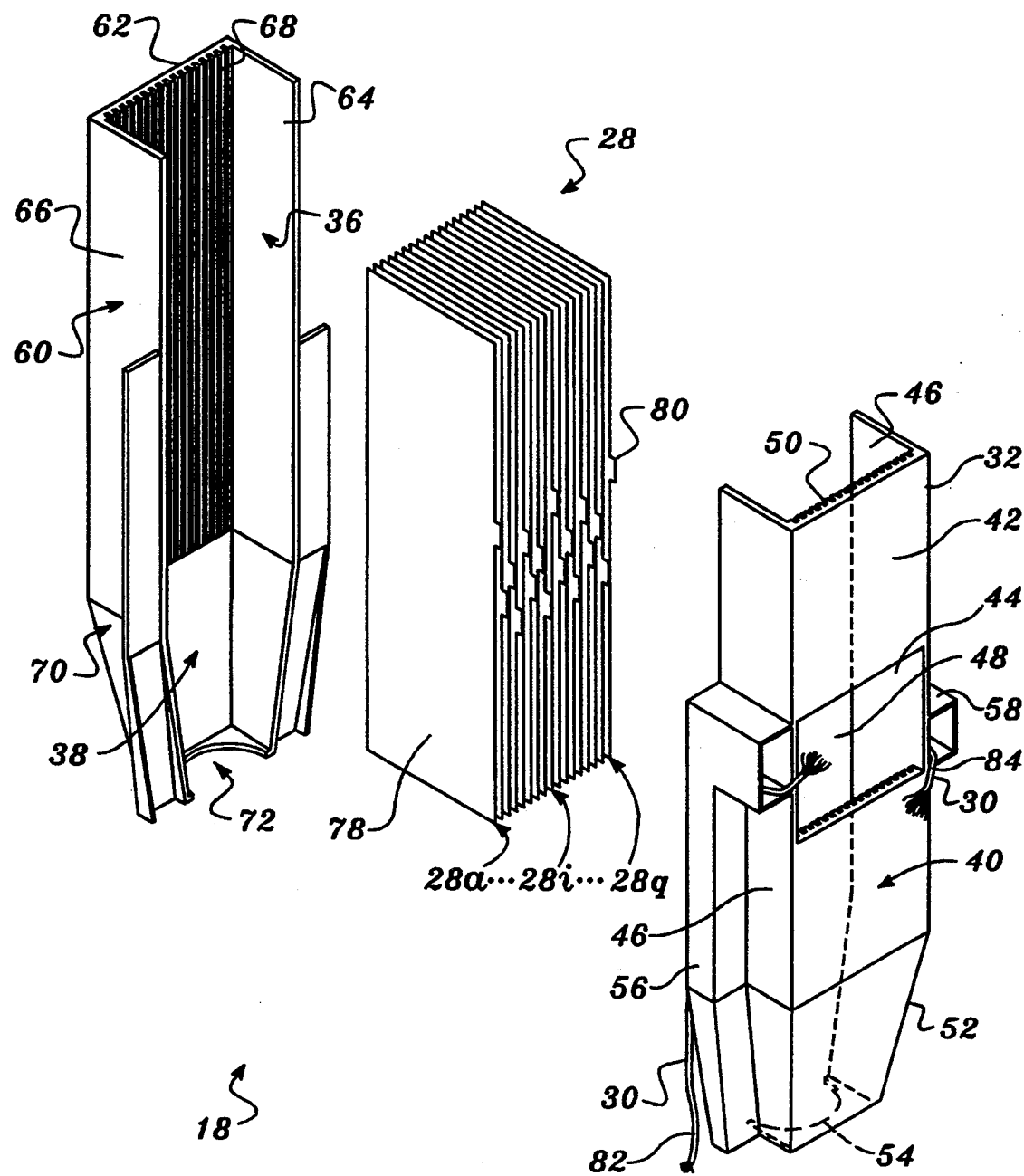
FIG. 3 is a perspective view of an electrode assembly included in the electrolytic cell of FIG. 2, with parts shown in exploded relationship.

Addressing the construction of the first section 32 of housing 26 in greater detail, the portion of the first section 32 that defines the electrode chamber 36 includes a channel piece 40 formed by a panel 42 and sides 44 and 46. A rectangular opening 48 is provided in panel 42, midway between its two ends, and a plurality of longitudinally-extending, electrode retention grooves 50 are provided on the inside of panel 42. The first section 32 also includes an inlet piece 52, which extends from the channel piece 40 and exhibits a tapered cross section. A semicircular opening 54, hidden in FIGS. 2 and 3, is provided at the end of inlet piece 52 to form one half of a fluid inlet.

The sides 44 and 46 of the first section 32 of housing 26 further include the front portions of wiring conduits 56 and 58, respectively. As illustrated in FIG. 2, conduits 56 and 58 are roughly L shaped, rectangular in cross section, and include openings positioned adjacent to the opening 48 in panel 42. These openings are provided in a longitudinally staggered configuration that allows the electrical wiring 30 received within the conduits to be attached to the various electrodes in a relatively streamlined fashion described in greater detail below. The conduits 56 and 58 also terminate in openings adjacent the end of inlet piece 52, from which the electrical wiring 30 extends to the control circuit 20.

The front portions of conduits 56 and 58 extend axially along the open or back side of first section 32, and are also open to the back of first section 32. As will be described in greater detail below, the front portions are closed by back portions provided on section in arrangement that makes it easier to form sections 32 and 34, and to run wiring 30 through conduits 56 and 58.

The second section 34 of housing 26 mirrors the first section 32, with the exceptions that the opening 48 is eliminated and the back, rather than front, portions of conduits 56 and 58 are provided. More particularly, the second section 34 includes a channel piece 60 having a panel 62 and two sides 64 and 66. A plurality of electrode retention grooves 68 are provided on the inside of panel 62 for receiving the electrodes 28. A tapered inlet piece 70 extends from the channel piece 60 and includes a semicircular opening 72, which, in cooperation with opening 54, defines a fluid inlet. As shown, the back portions of conduits 56 and 58 project substantially normal to the sides 64 and 66 and, as noted above, seat against the front portions to form conduits 56 and 58 when the housing 26 is assembled.

As will be appreciated, the relative size, shape, construction, and materials of the housing 26 can be altered as desired. In the currently preferred arrangement, however, housing 26 is generally rectangular in cross section and defines an electrode chamber 36 that is roughly 20.5 centimeters by 5.4 centimeters by 5.1 centimeters. The electrode retention grooves 50 and 68 are roughly 0.06 centimeters wide, spaced apart by a distance of roughly 0.2 centimeters and may extend the full length of the electrode plates or be shorter and spaced apart to support the electrode plates at several points. The inlet chamber 38 is roughly 8.1 centimeters long and tapers to a cross section of roughly 4.8 centimeters by 4.5 centimeters. When the first section 32 and second section 34 are joined, the semicircular openings 54 and 72 define a fluid inlet of roughly 23.5 square centimeters. Similarly, the open upper end of housing 26, defined by the first section 32 and second section 34, provides a square fluid outlet of roughly 25.6 square centimeters. Sections 32 and 34 are preferably molded from a fluid-impervious plastic, such as polyethylene terephthalate glycol (PETG).

Having reviewed the construction of housing 26, the construction of electrodes 28 will now be considered in greater detail. As shown in FIG. 3, seventeen electrodes 28 are preferably employed. Each electrode 28 includes a substantially rectangular body 78 that is positioned within housing 26 to contact the fluid to be filtered. A connection tab 80, aligned in the same plane as electrode body 78, projects from one edge of the electrode body 78. As will be described in greater detail below, the connection tabs 80 are designed to extend through opening 48 in the first section 32 of housing 26 to allow electrical connections to be made to the electrodes 28.

The electrodes 28 are preferably made of an electrically conductive, fluid impervious material, such as a ceramic. The electrode body 78 is roughly 20.3 centimeters by 6.0 centimeters by 0.06 centimeters. Connection tab 80 is, for example, roughly 0.6 centimeters by 0.5 centimeters by 0.06 centimeters. As shown in FIG. 3, the location of the connection tab 80 between the two ends of the electrode body 78 varies from electrode to electrode.

Reviewing the relative location of the connection tabs in greater detail, the electrodes 28 are separately designated 28a through 28q in FIG. 3. The tabs 80 on electrodes 28a, 28b, 28f, 28i, 28j, 28n, and 28q are all spaced roughly 8.3 centimeters from one end of their respective electrode bodies 78, with the orientation of electrodes 28a, 28i, and 28q being reversed from that of electrodes 28b, 28f, 28j, and 28n. The tabs 80 on electrodes 28c, 28g, 28k, and 28o are spaced midway between the two ends of their respective electrode bodies 78. Finally, the tabs 80 on the remaining electrodes 28d, 28e, 28h, 28l, 28m, and 28p are spaced roughly 9.2 centimeters from one end of their respective electrode bodies 78, with the orientation of electrodes 28d, 28h, 28l, and 28p being reversed from that of electrodes 28e and 28m. As shown in FIG. 3, the varied location of the electrode tabs 80 effects a staggered alignment that makes it easier to provide electrical connections to individual electrodes.

With the first section 32 and second section 34 of housing 26 secured together by epoxy or other fasteners (not shown), the electrodes 28 are retained in slots 50 and 68 and the tabs 80 on the various electrodes 28 project from the opening 48 in housing 26, allowing electrical connections to be made thereto. These connections are made by the electrical cables 30, which are separately identified in FIG. 3 as cables 82 and 84. Cable 82 is a stranded wire cable positioned within wiring conduit 56 and has one end connected to the connection tabs 80 of electrodes 28a, 28c, 28e, 28g, 28i, 28k, 28m, 28o, and 28q by, for example, soldering or fastening hardware (not shown). The other end of cable 82 terminates at the control circuit 20. Similarly, cable 84 is a stranded wire cable received within wiring conduit 58. One end of cable 84 is coupled to the connection tabs 80 of electrodes 28b, 28d, 28f, 28h, 28j, 28l, 28n, and 28p and the other end terminates at the control circuit 20.

Once the housing sections 32 and 36 have been fastened together and the appropriate connections made between cables 82 and 84 and the various electrodes 28, the connection tabs 80, electrical connections between cables and tabs, and the opening 48 are enclosed by an encapsulant, such as an epoxy. As a result, the electrical connections are insulated from one another and protected from environmental contaminants. Further, by closing the opening 48, fluid flow through the electrode assembly 22 is confined to a path traversing substantially the full length of the spaced-apart electrodes 28.

As noted previously, the electrode assembly 22 is positioned in, and axially aligned with, reservoir 24. The reservoir 24 is employed to store fluid processed by the electrode assembly 22 before it is provided to the supplied environment 14. The reservoir 24 may, for example, be a roughly cylindrical structure made of a fluid impervious plastic such as spun fiber glass (reinforced), acrylonitrite butadiene styrene (ABS). The reservoir 24 preferably is roughly 0.6 centimeters thick, 100 centimeters long and 40.6 centimeters in diameter. The fluid inlet 74 of electrode assembly 22 extends through the base of reservoir 24, defining a fluid inlet into reservoir 24. A fluid outlet 88 is provided in the top of reservoir 24. As will be appreciated, the reservoir may be equipped with a removable cover, in which the outlet 88 would be provided, allowing access to the electrode assembly 22.

Figure 4:
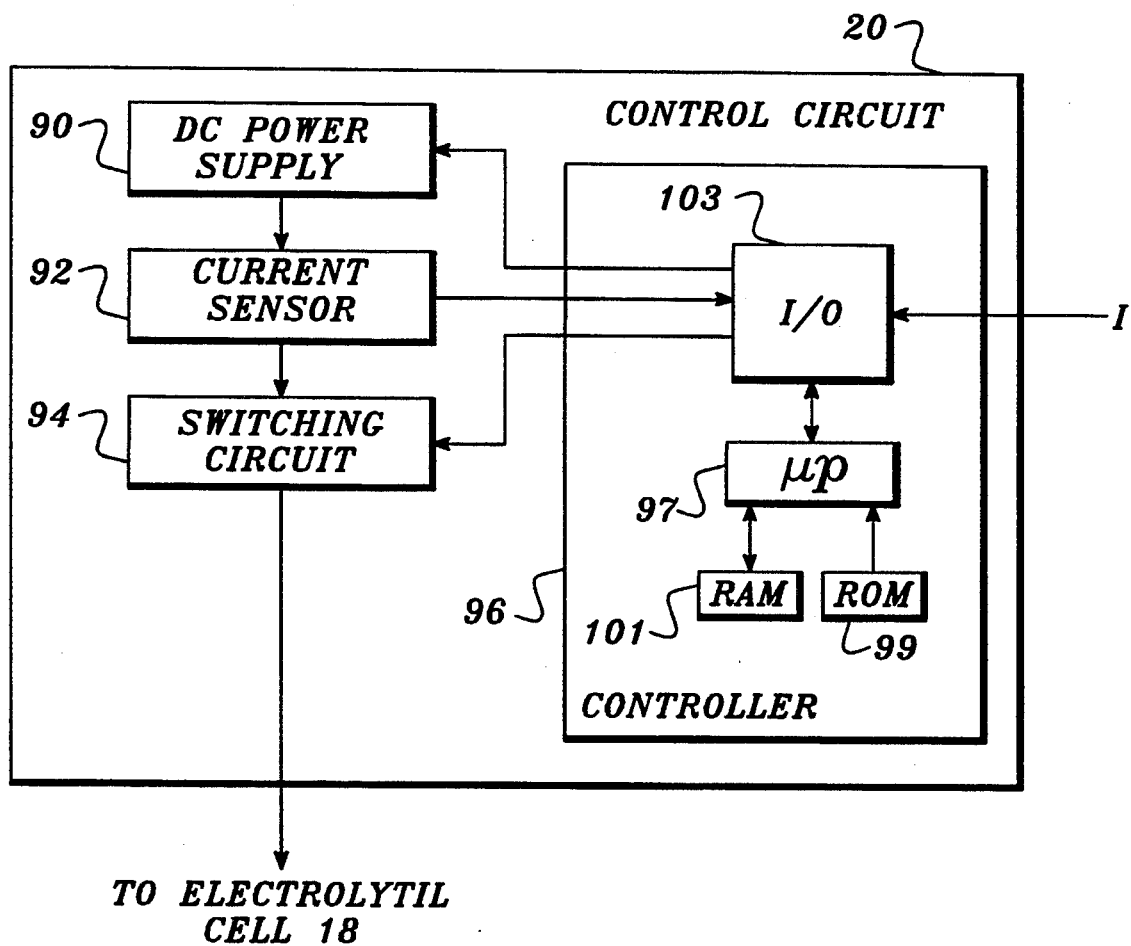
FIG. 4 is a block diagram of a control circuit included in the filter system of FIG. 1.

Having reviewed the basic construction of electrolytic cell 18, a more detailed discussion of the control circuit 20 will now be provided. As shown in FIG. 4, control circuit 20 includes, for example, a DC power supply 90, current sensor 92, switching circuit 94, and a controller 98.

Reviewing these components of control circuit 20 individually, the DC power supply 90 may be of any conventional design suitable for providing energy to the electrolytic cell 18. In that regard, power supply 90 may include a transformer for converting a source of AC input voltage from one level to another, for example, reduced level. A rectifier circuit may also be included to convert the transformed AC voltage to a suitable DC voltage. Finally, a regulation and filtration circuit may be included to ensure that the rectified voltage has the desired DC characteristics.

The current sensor 92 is coupled to the output of DC power supply 90 to monitor current flow to cell 18. Current sensor 92 may be, for example, an ammeter capable of producing outputs representative of currents ranging from one to thirty amperes. The outputs of current sensor 92 are provided to controller 96, while the current flowing through current sensor 92 is provided to the electrolytic cell 18 via switching circuit 94.

Figure 5:
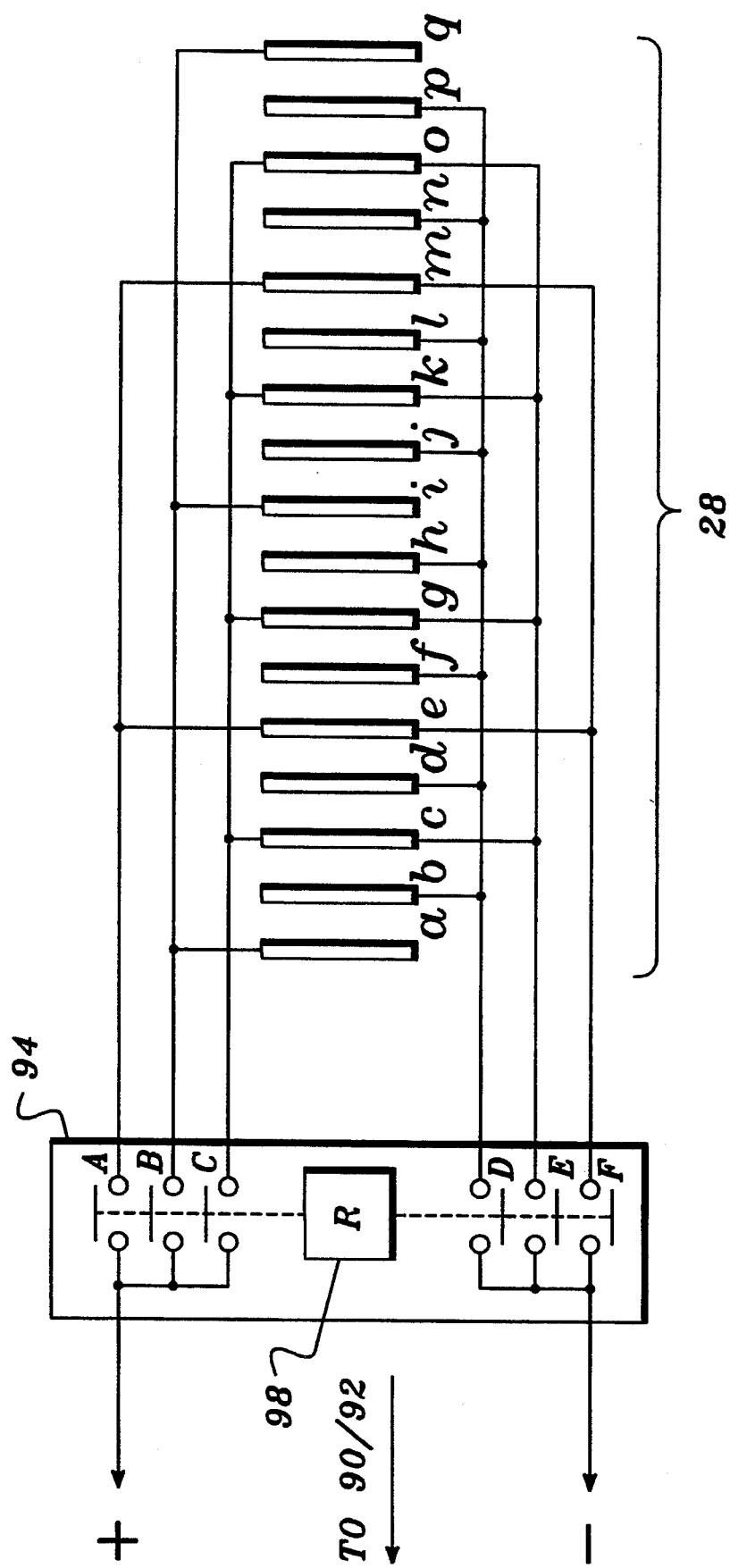
FIG. 5 is a schematic diagram of the electrodes included in the assembly of FIG. 3 and a switching circuit used to alter the connection of the electrodes.

The switching circuit 94 is illustrated in greater detail in FIG. 5 and is responsible for electrically reconfiguring the electrode assembly 22, as described in greater detail below. Switching circuit 94 may include, for example, an electromechanical relay 98 with six pairs of contacts A, B, C, D, E, and F that can be independently opened and closed. The relay 98 receives inputs from controller 96, which determines which of the varied contact pairs A, B, C, D, E, and F will be open and closed.

Contact pairs A, B, and C are coupled in parallel and are used to control which electrodes will be operated as anodes. As shown in FIG. 5, one side of contact pair A is coupled to the positive output of power supply 90, while the other side is coupled to electrodes 28e and 28m. Similarly, one side of contact pair B is coupled to the positive output of power supply 90, while the other side is coupled to electrodes 28a, 28i, and 28q. In addition, one side of contact pair C is coupled to the positive output of power supply 90, while the other side is coupled to electrodes 28c, 28g, 28k, and 28o.

Contact pairs D, E and F are similarly coupled in parallel and used to control which electrodes will be used as cathodes. As shown in FIG. 5, one side of contact pair D is coupled to the negative output of power supply 90, while the other side is coupled to electrodes 28b, 28d, 28f, 28h, 28j, 28l, 28n, and 28p. One side of contact pair E is coupled to the negative output of power supply 90, while the other side is coupled to electrodes 28c, 28g, 28k, and 28o. Finally, one side of contact pair F is coupled to the negative output of power supply 90, while the other side is coupled to electrodes 28e and 28m.

Turning now to a discussion of the controller 96, controller 96 is responsible for directing the desired electrical reconfiguration of the electrode assembly 22 by switching circuit 94, as well as other tasks described below. In one embodiment, the controller 96 includes a microprocessor 97, read only memory (ROM) 99 for storing program instructions to be executed by microprocessor 97, random access memory (RAM) 101 for storing data processed by microprocessor 97, and suitable interfaces 103 for allowing microprocessor 97 to communicate with the remaining components of the control circuit 20. As will be appreciated, these components are each of conventional design.

Having reviewed the basic construction of electrolytic cell 18 and control circuit 20, their cooperative operation to achieve the desired fluid treatment, relatively independent of variations in water resistivity, will now be described in conjunction with the flow chart of FIG. 6. In that regard, the ROM 99 is preprogrammed with instructions for use by the microprocessor 97 in controlling the operation of cell 18, as described in greater detail below. A variety of external inputs I are also received from the operator and stored in RAM 101 to initialize operation of circuit 20, as indicated by block 100. These external inputs, which also may be altered by the operator during use, include the various current threshold levels and time intervals employed by the control circuit 20.

At start-up, block 102, the microprocessor 97 provides an output to the DC power supply 90, causing the power supply to apply a predetermined voltage of, for example, sixty volts to the switching circuit 94 via current sensor 92. This occurs at time $t_0$, shown graphically in FIG. 7. The controller 96 also provides an output to relay 98, which causes contact pairs A, B, C, and D to close and contact pairs E and F to open. As a result, electrodes 28a, 28c, 28e, 28g, 28i, 28k, 28m, 28o, and 28q are connected to the positive output of supply 90 for use as anodes. Electrodes 28b, 28d, 28f, 28h, 28j, 28l, 28n, and 28p, on the other hand, are connected to the negative output of supply 90 for use as cathodes. As will be appreciated, the effective separation between active anodes and cathodes in this first mode of operation is therefore roughly 0.2 centimeters.

Next, at block 104, the microprocessor 97 is instructed to monitor the output of current sensor 92. As will be appreciated, the output of current sensor 92 represents the current flowing through cell 18 as a whole. If desired, the microprocessor 97 may also divide this total current by the number of active electrode pairs to determine the current flowing through each electrode for use in future evaluations. This initial determination of current at block 104 is performed at some time $t_1$ after $t_0$. In the preferred arrangement, $t_1$ will be on the order of 0.01 seconds and no longer than 0.05 seconds after $t_0$.

Assume that water applied to cell 18 from source 12 has a relatively low resistivity and that, for the electrode area and separation described above, the resistance R of the water between the adjacent active electrodes is on the order of 0.5 ohms. The current between the electrodes will then be on the order of 120 amperes. This relatively high current level is depicted graphically in FIG. 7.

At block 106, the microprocessor 97 in controller 96 compares the total or pre-electrode current to some acceptable threshold T preprogrammed into ROM 99 or stored in RAM 101 via an operator input. If the microprocessor determines that the current is above the acceptable threshold T at time $t_1$, the microprocessor 97 causes the switching circuit to reconfigure the electrodes at block 108 to achieve a greater active electrode separation. Specifically, relay 98 is actuated to close contacts A, B, and E, while contacts C, D, and F are open. As a result, electrodes 28a, 28e, 28i, 28m, and 28q are connected as cathodes d and electrodes 28c, 28g, 28k, and 28o are connected as anodes. As a result, the distance between adjacent active electrodes in this second mode of operation is doubled from its initial value. Likewise, the interelectrode resistance is doubled and the current, in turn, drops to roughly one-half its previous value.

Figure 6:
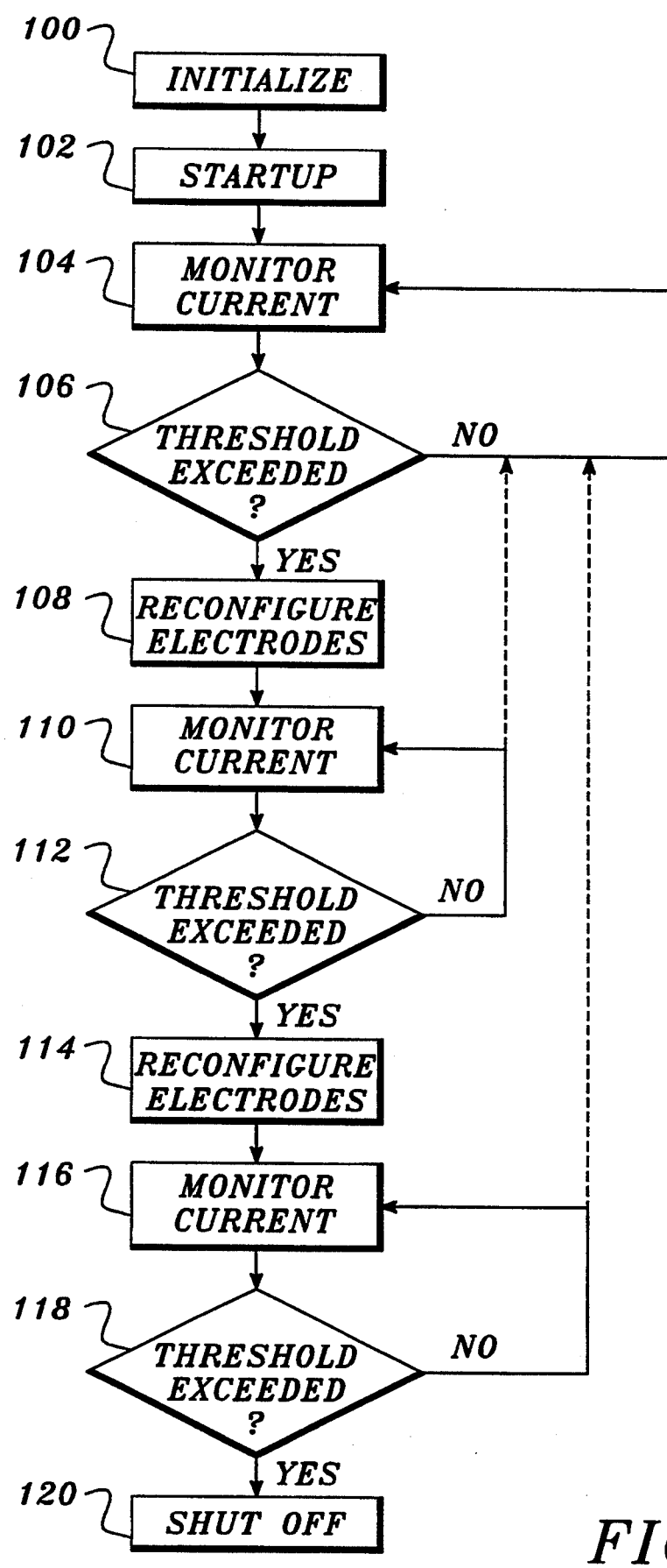
FIG. 6 is a flow chart depicting the operation of the control circuit of FIG. 4.
Figure 7:
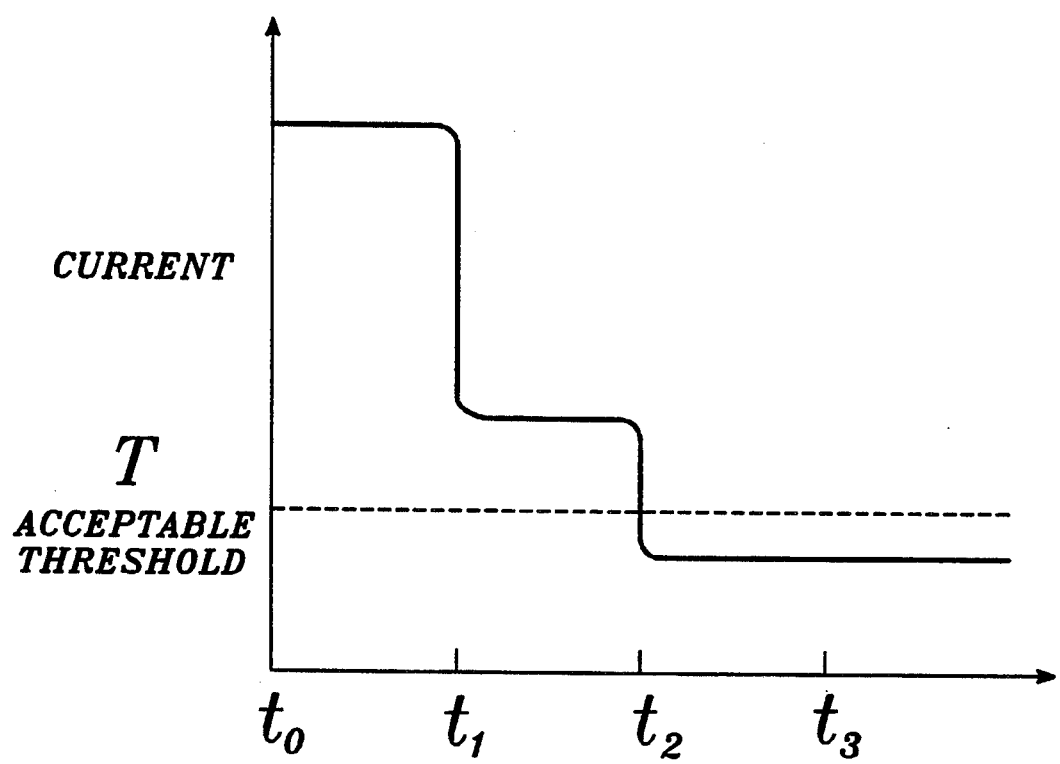
FIG. 7 is a graph depicting some potential current adjustments made by the control circuit of FIG. 4.

As indicated in FIGS. 6 and 7, some time $t_2$, preferably on the order of 0.01 seconds after $t_0$, the microprocessor 97 in controller 96 monitors the current at block 110 and compares the current output of sensor 92 to the acceptable threshold T at block 112. In the event that the current still exceeds threshold T, the microprocessor 97 causes switching circuit 94 to reconfigure the electrical connections to the various electrodes at block 114. Specifically, an output is provided to relay 98 to close contacts B and F, leaving contacts A, C, D and E open. As a result, electrodes 28a, 28i, and 28q are connected for use as anodes, while electrodes 28e, and 28m are connected for use as cathodes. The separation between active electrodes is, thus, increased to four times its original value in this third mode of operation, making the interelectrode resistance four times as high and the current roughly one-fourth its original level.

The current is then monitored again at block 116 and a third, and final, current comparison is performed by microprocessor at time $t_3$. Specifically, the output of current sensor 92 is evaluated at block 118 to determine whether the current still exceeds the acceptable threshold. If the threshold T is exceeded, the system is shut off at block 120 to prevent damage to the control circuit due to the high currents provided to the relatively low resistivity water. As will be appreciated, the interval of time between $t_0$ and $t_3$ is kept sufficiently short so that, even with relatively high currents drawn, the circuit will not be damaged.

Another way of protecting the control circuit 20 from high currents while the desired electrode configuration is being established is to lower the voltage applied between active electrodes. For example, rather than using the sixty volt "filtering" potential, a lower, six volt "test" potential can be advantageously applied across active electrodes during this initial phase of operation. The current flowing between active electrodes will then be reduced to one-tenth the level that would otherwise be experienced. With threshold T similarly established at one-tenth the desired current level, the microprocessor 97 is then able to control switching circuit 94 to produce an electrode configuration that will achieve the desired current level when sixty volt operation is restored. To that end, once the appropriate electrode arrangement has been established, microprocessor 97 would then initiate the application of the higher potential to cell 18.

In addition to allowing a suitable configuration for the electrodes 28 to be initially established in response to the particular water characteristics experienced, the control circuit 20 may, in some circumstances, also allow the electrodes to be reconfigured during operation of the system 10 in response to fluctuations in water resistivity. In that regard, suppose that the microprocessor 97 determines that the threshold T is not exceeded at any one of blocks 106, 112, or 118. The configuration of the electrodes is, in that situation, suitably matched to the water resistivity and a current of less than 30 amperes is applied between the electrodes. The operation of the microprocessor 97 is then returned to the preceding current monitor block 104, 110, or 116, as shown. There, the current is monitored again and compared to the threshold T to maintain the same electrode configuration as long as the threshold T is not exceeded. The operation would then be restored to block 104 (as indicated by the broken lines in FIG. 6) to allow a closer active electrode spacing to be established, if possible, without exceeding the acceptable current threshold level T.

As will be appreciated, however, it may be undesirable to perform this type of "running" adjustment under some circumstances. For example, if a low "test" voltage is used during the electrode configuration process to avoid potentially damaging currents, the electrode configuration can not be tested without interrupting the higher voltage "electrolytic" operation of the cell. Alternatively, if the higher electrolytic voltage is used to perform running tests of the electrode arrangement, the control circuit or cell may be damaged by the relatively high currents.

Figure 8:
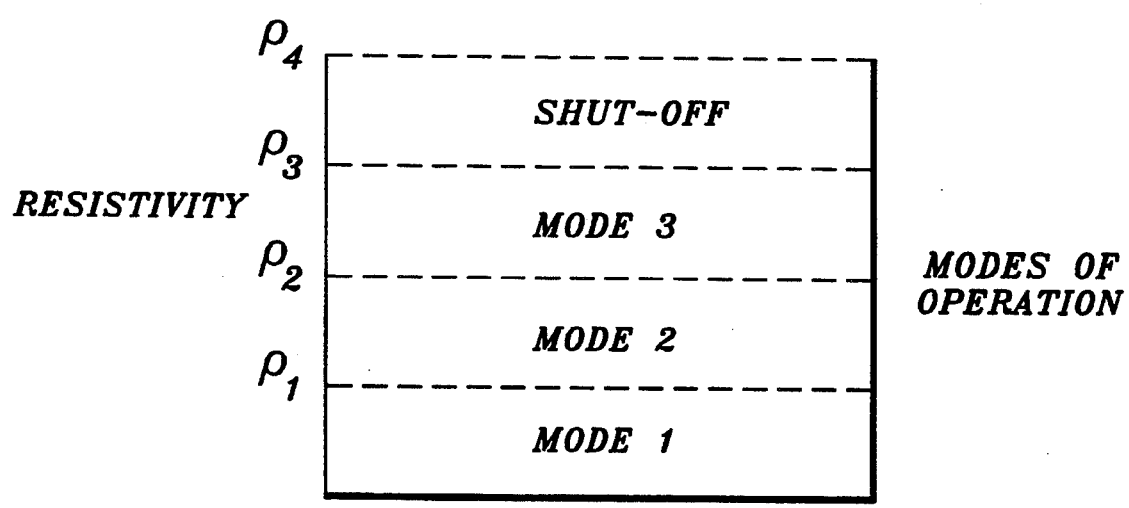
FIG. 8 is another graph depicting various modes of operation of the control circuit of FIG. 4 as a function of water resistivity.

Recapping the foregoing discussion, substantially constant current operation of the cell 18 will be maintained independent of one thousand fold changes in the water's resistivity, due, for example, to differences in water supplies, variations in water composition, and water temperature fluctuations. A chart comparing the various modes of operation described above as a function of water resistivity is provided in FIG. 8. As depicted, the system could be constructed so that, in the event the water's resistivity is above 100 ohm-meter, the system will operate in the first mode, in which the electrode spacing is smallest. In the event the resistivity is between 10 and 100 ohm-meter, the system would then operate in the second mode, in which an intermediate electrode separation is achieved. Further, in the event the resistivity is between 1 and 100 ohm-meter, the system would operate in the third mode, in which the active electrode separation is greatest. Finally, if the resistivity is below 1 ohm-meter, the system will operate in the shut-off mode in which current is no longer provided to the electrolytic cell. The relationship between the various resistivities and modes of operation given above will, of course, depend upon the construction and operation of the system.

As will be appreciated, a variety of alternative configurations and operations of the electrolytic cell 18 and control circuit 20 can be employed. In that regard, additional tests and connections of the seventeen electrodes 28 could be employed. For example, the control circuit 20 could reconfigure the electrodes to operate electrodes 28a and 28q as anodes and electrode 28i as a cathode, to increase interelectrode resistance by eight times its original value and decrease current by eight times its original value. A greater or lesser number of electrodes than seventeen could alternatively be employed. Seventeen electrodes are, however, currently preferred because they allow several different reconfigurations of the electrodes to be achieved while always maintaining a charge on the outermost electrodes. Also, different thresholds T can be employed at blocks 106, 112, and 118 and different time limits $t_0$, $t_1$, $t_2$, and $t_3$ can be employed as desired.

As noted previously, the spacing of the active electrodes is only one of the variables that influence the interelectrode resistance and, hence, the current flowing between the electrodes for a particular voltage applied thereto. For example, the interelectrode resistance is also inversely proportional to electrode area. In that regard, FIG. 9 illustrates an alternative construction of electrodes that can be reconfigured by a control circuit to allow the effective area, rather than their separation, of the electrodes to be altered as a function of water resistivity.

Figure 9:
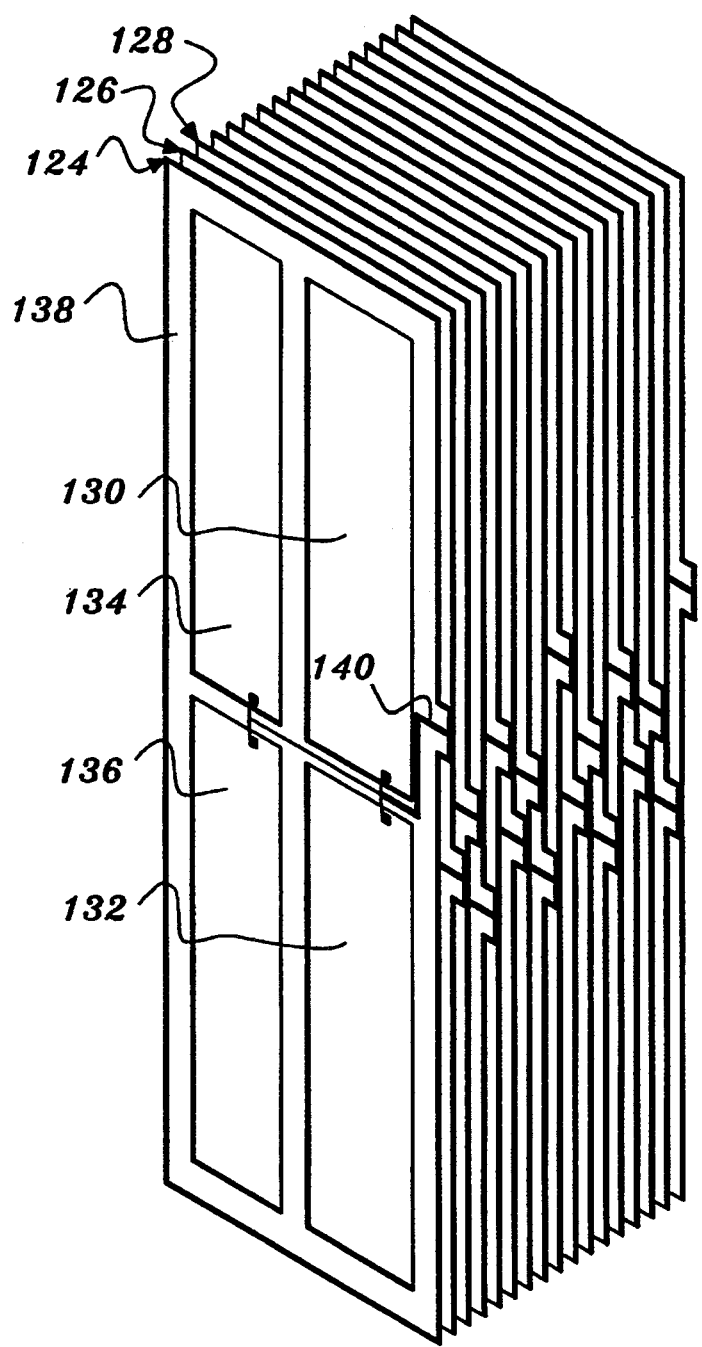
FIG. 9 is an illustration of an alternative mechanical arrangement and construction of the electrodes of FIG. 3.

For simplicity, FIG. 9 illustrates only three electrode assemblies 124, 126, and 128. As will be described in greater detail below, additional electrode assemblies (e.g., seventeen total) can be employed and alternatively reconfigured as anodes and cathodes in the manner previously described in connection with FIGS. 2 through 8.

Each electrode assembly 124, 126, and 128 includes four electrodes 130, 132, 134, and 136. These electrodes are made of an electrically conductive, fluid impervious material, such as a ceramic, and have dimensions of roughly 10 centimeters by 2.85 centimeters by 0.06' centimeters. The electrodes 130, 132, 134, and 136 are supported in a common plane by a grid 138 formed of a dielectric material, which electrically and mechanically isolates adjacent electrodes, while allowing the faces of the electrodes to be exposed to the fluid. In the preferred arrangement, the grid is molded around the electrodes. Separate electrical connections 140 are then provided to each of the electrodes by, for example, soldering or fasteners.

The electrode assemblies 124, 126, and 128, as well as any additional electrode assemblies employed, are received within the electrode retention grooves 50 and 68 of a housing 26 of the type previously described. The resultant electrolytic cell can then be operated by the previously described control circuit 20 with several modifications to the switching circuit 94 and the program instructions stored in ROM 99.

Figure 10:
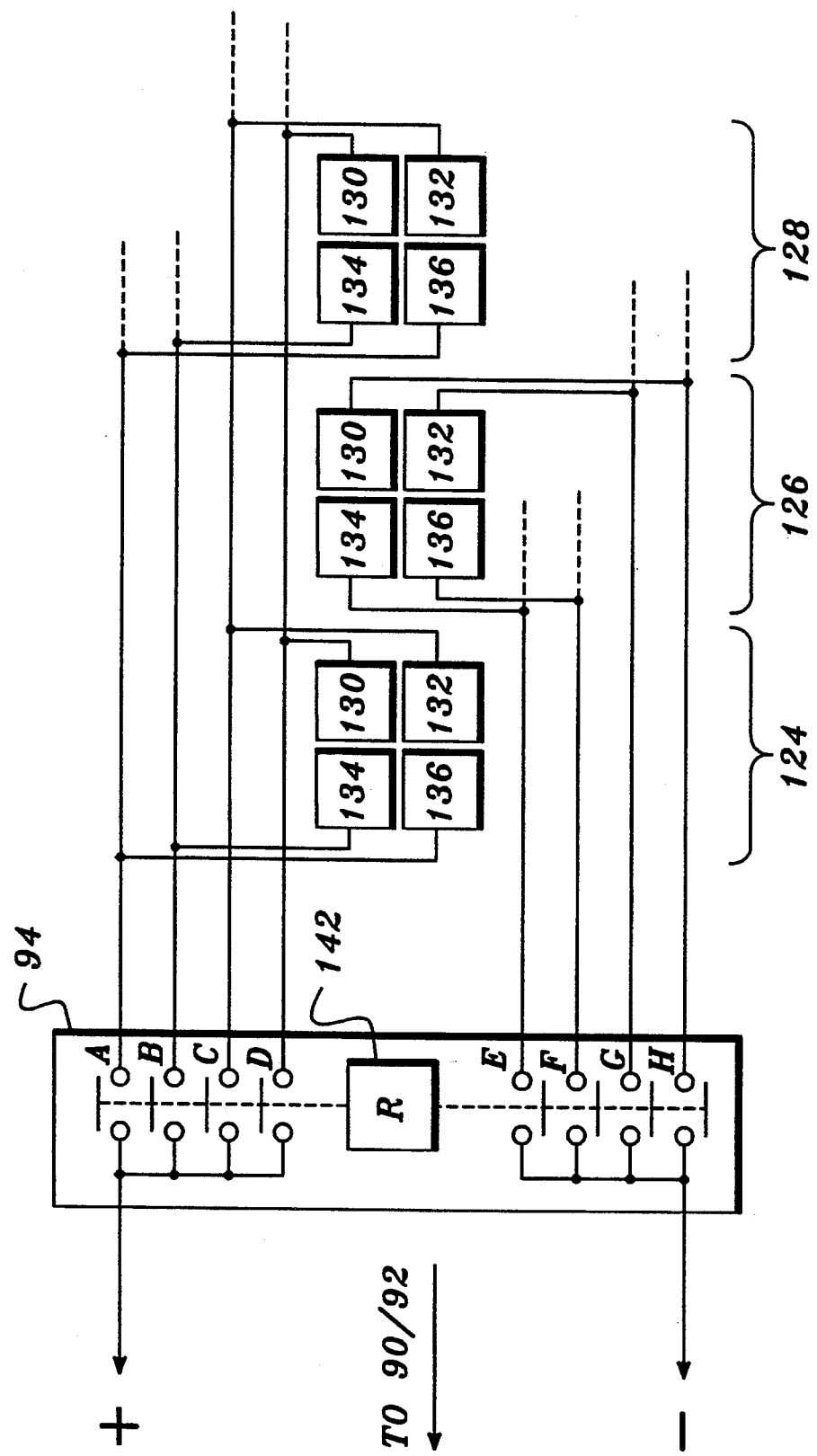
FIG. 10 is a schematic diagram of the electrodes included in the arrangement of FIG. 9, with a switching circuit used to alter the connection of the electrodes.

In that regard, the electrical connection of the various electrode assemblies 124, 126, and 128 to the control circuit 20 is illustrated in FIG. 10. As shown, the switching circuit 94 includes a relay 142 having eight pairs of contacts A, B, C, D, E, F, G, and H. Contact pairs A, B, C, and D are activated to control the electrode assemblies to be used as anodes and contact pairs E, F, G, and H are activated to control the electrode assemblies to be used as cathodes.

More particularly, one side of each of the contact pairs A, B, C, and D is coupled to the positive output of power supply 90. The other sides of contact pairs A, B, C, and D are connected to electrodes 136, 134, 132, and 130, respectively, of electrode assemblies 124 and 128. Similarly, one side of each of the contact pairs E, F, G, and H is connected to the negative output of power supply 90, while the other sides of contact pairs E, F, G, and H are connected to electrodes 134, 136, 132, and 130, respectively, of electrode assembly 126. The microprocessor 97 controls the operation of the contact pairs in the following manner.

Figure 11:
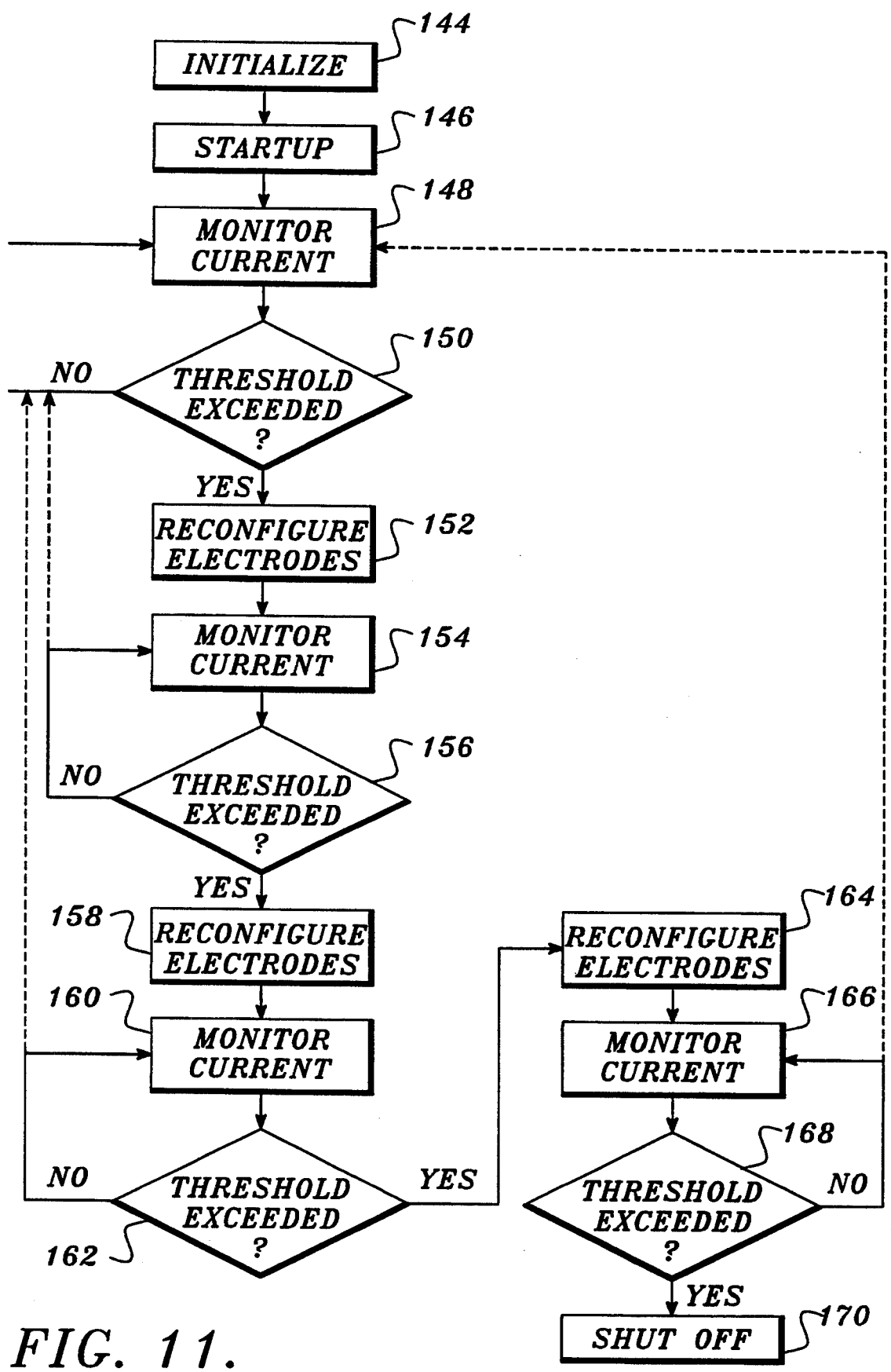
FIG. 11 is a flow chart depicting the operation of the control circuit to regulate the electrode connections of FIG. 10.

Referring now to FIG. 11, the control circuit is initialized at block 144. Then, the microprocessor 97 activates the power supply 90 at block 146 and sends an output to the relay 142 in switching circuit 94 to close each of switches A, B, C, D, E, F, G, and H. As a result, all four electrodes of assemblies 124 and 128 are connected for use as an anode and all four electrodes of assembly 126 are connected for use as a cathode. Thus, the active area of electrode assemblies 124, 116, and 128 is at a maximum, equal to roughly 115 square centimeters.

At block 148, the microprocessor 97 monitors the current. If the resistivity of the water is low, the current may exceed the acceptable threshold T. The microprocessor 97 makes this evaluation at time $t_1$ and block 150 and, with the threshold T exceeded, reconfigures the electrodes at block 152. Specifically, the microprocessor 97 provides outputs to relay 142 of switching circuit 94 to open contract pairs A and F. As a result, electrodes 134, 130, and 132 of assemblies 124 and 128 will be connected for use as anodes and electrodes 134, 132, and 130 of electrode assembly 126 will be connected for use as a cathode. Thus, the area of the electrode assemblies is effectively reduced by one-fourth, increasing the interelectrode resistance and decreasing the current.

At time $t_2$, the microprocessor 97 again monitors the output of current sensor 92 at block 154. A comparison to threshold T is then performed at block 156 to determine whether the current has been decreased sufficiently. In the event that it remains above the acceptable level, the microprocessor 97 again provides outputs to switching circuit 94 at block 158 to further open switches B and E. As a result, electrodes 132 and 130 of assemblies 124 and 128 are connected as a cathode and only electrode 130 of assembly 126 is connected as an anode. At this point, the effective area of the electrode assemblies is one-half its original value, further increasing the interelectrode resistance and decreasing the current.

At time $t_3$, the microprocessor 97 again monitors the output of current sensor 92 at block 160. A comparison to threshold T is then performed at block 162 to determine whether the current has been decreased sufficiently. In the event that it remains above the acceptable level, the microprocessor 97 again provides outputs to switching circuit 94 at block 164 to further open switches C and G. As a result, only electrodes 130 of assemblies 124 and 128 will be connected as cathodes and only electrode 130 of assembly 126 will be connected as an anode. At this point, the effective area of the electrode assemblies is one-fourth its original value, further increasing the interelectrode resistance and decreasing the current.

Finally, the microprocessor 97 again monitors the output of current sensor 92 at some time $t_4$, as indicated at block 166. A test is performed at block 168 to determine whether the current has been reduced to an acceptable level. In the event that it has not, the microprocessor 97 provides outputs to switching circuit 94 at block 170, opening all the contact pairs and preventing further operation of the cell and damage to the system.

As with the previously described arrangement, in the event that a particular electrical reconfiguration is determined to be successful in achieving the desired current levels at blocks 150, 156, 162, or 168, the operation of the microprocessor 97 continues to loop through the test reconfigurations depicted in FIG. 6. As a result, the circuit can be used to adaptively respond to changes in water resistivity with source, time and temperature.

As will be appreciated, the arrangement of FIGS. 9 and 10 can also be altered as desired. In that regard, as indicated previously and by the dotted lines in FIG. 10, additional electrode assemblies can be employed. Further, more or less electrodes can be included in the different assemblies. The arrangements depicted in FIGS. 5 and 10 can also be combined to provide a system in which both the effective area and separation of the electrodes can be altered by electrically reconfiguring the electrodes to provide even greater control over current level and response to conductivity variations in the water.

Those skilled in the art will recognize that the embodiments of the invention disclosed herein are exemplary in nature and that various changes can be made therein without departing from the scope and the spirit of the invention. In this regard, the invention can be employed in the treatment of fluids other than water used, for example, in lubrication, hydraulic, and pneumatic systems. Similarly, with appropriately selected sensors, the system can be made responsive to water characteristics other than resistivity or conductivity. Because of the above and numerous other variations and modifications that will occur to those skilled in the art, the following claims should not be limited to the embodiments illustrated and discussed herein.

The embodiments of the invention in which an exclusive property or privilege is claimed are defined as follows:

1. Electrolytic fluid treatment apparatus for treating a fluid, said apparatus comprising several electrodes exposed to the fluid, support means for physically supporting said electrodes, electrical reconfiguration means for providing electrically reconfigurable interconnections of a plurality of said electrodes with each other, and sensing means for producing an output representative of a characteristic of the fluid, said electrical reconfiguration means including means responsive to said output for automatically reconfiguring the interconnection of the plurality of electrodes in response to said output during treating of the fluid.

2. The apparatus defined in claim 1, in which the sensing means includes means for producing an output representative of the resistivity of the fluid.

3. The apparatus defined in claim 2, including energy source means for providing electrical current to the electrodes, the electrical reconfiguration means including means for controlling the flow of current between the electrodes actuated by the energy source means, the sensing means including means for sensing the magnitude of current between the electrodes indicative of the resistivity of the fluid.

4. The apparatus defined in claim 3, in which the support means supports the electrodes in a fixed physical arrangement, the electrical reconfiguration means including means for reconfiguring the interconnection of the plurality of electrodes so as to adjust the effective distance between electrodes powered by the energy source means.

5. The apparatus defined in claim 4, in which the electrical reconfiguration means includes means for reconfiguring the interconnection of the plurality of electrodes so as to change the effective area of the electrodes powered by the energy source means as a function of the resistivity of the fluid.

6. The apparatus defined in claim 3, in which the electrical reconfiguration means includes means for electrically interconnecting a first set of the electrodes as anodes and a second set of the electrodes as cathodes when the output of the sensing means is representative of fluid resistivity above a predetermined threshold level.

7. The apparatus defined in claim 3, in which the electrical reconfiguration means includes means for electrically interconnecting a first set of the electrodes for use as anodes and a second set of the electrodes for use as cathodes when the output of the sensing means is representative of fluid resistivity below a predetermined threshold level.

8. The apparatus defined in claim 7, in which the several electrodes include eight electrodes supported side-by-side, and in which the electrical reconfiguration means includes means for configuring the eight electrodes, respectively, as anode, neutral, neutral, neutral, cathode, neutral, neutral, neutral, when the output of the sensing means is representative of fluid resistivity below a predetermined threshold.

9. The apparatus defined in claim 3, in which the electrical reconfiguration means includes means for controlling the number of individual electrodes between which current flows.

10. The apparatus defined in claim 1, in which the electrodes includes a multiplicity of electrode plates, each of said plates having a connection edge and a connection tab projecting therefrom, each connection tab being roughly centered on its connection plate.

11. The apparatus defined in claim 10, in which the electrode plates are supported by the support means with the connection edges substantially aligned in a common plane.

12. The apparatus defined in claim 10, in which the support means includes a shell having an internal cavity and a pair of external channels, the connection tabs of the electrode plates projecting from said shell, and including several wires electrically connected to the connection tabs and positioned in said channels.

13. The apparatus defined in claim 12, in which each of the external channels includes an electrode end, said electrode ends of the channels being staggered relative to the connection tabs of the connection tabs projecting from the shell.

14. The apparatus defined in claim 1, in which the electrical reconfiguration means includes a switching circuit for providing a plurality of switchable electrical interconnections between the electrodes.

15. The apparatus defined in claim 14, in which the electrical reconfiguration means includes a microprocessor for controlling the switching circuit to provide the electrically reconfigurable interconnections between the electrodes.

16. The apparatus defined in claim 1, in which the support means encircles the electrodes and defines a fluid path through the electrodes.

17. The apparatus defined in claim 1, in which the electrodes are plates having opposite edge portions, the support means including a shell having a plurality of spaced grooves for receiving said edge portions of the plates.

18. Electrolytic fluid treatment apparatus for treating a fluid, said apparatus comprising an electrical power supply, several electrodes each for acting as different types of electrodes including anodes, cathodes and neutral electrodes depending on the connection of said electrodes with said power supply, means for interconnecting selected ones of said electrodes with each other, said interconnecting means including means for selectively reconfiguring the interconnections of said electrodes with each other so that different sets of electrodes are interconnectable to act as the same type of electrode, and sensing means for producing an output representative of a characteristic of the fluid, said interconnecting means being responsive to said output for automatically reconfiguring the interconnections of said electrodes in response to said output during treating of the fluid.

19. A method of electrolytically filtering a fluid which comprises passing the fluid between several electrodes, charging the electrodes to generate a current through the fluid between the electrodes, automatically evaluating a variable characteristic of the fluid, and automatically changing the interconnection of the electrodes with each other based on the evaluation of the characteristic of the fluid.

20. The method defined in claim 19, in which the characteristic of the fluid is resistivity.

21. The method defined in claim 20, in which the step of evaluating the resistivity of the fluid is performed by monitoring the current applied between at least two of the electrodes.

22. The method defined in claim 19, including arranging the electrodes in spaced, side-by-side relationship, and automatically changing the interconnection of the electrodes with each other to adjust the effective distance between charged electrodes as a function of the evaluated characteristic of the fluid.

23. The method defined in claim 19, in which several of the electrodes include a plurality of individual elements, and automatically changing the interconnection of the electrode elements to adjust the effective charged area of at least one of the electrodes as a function of the evaluated variable characteristic of the fluid.

* * * * *

UNITED STATES PATENT AND TRADEMARK OFFICE
CERTIFICATE OF CORRECTION

PATENT NO. : 5,389,214
DATED : February 14, 1995
INVENTOR(S) : R. K. Erickson, et. al.

It is certified that error appears in the above-indentified patent and that said Letters Patent is hereby corrected as shown below:

Title page, item [56], under Refs. Cited, insert --4,917,782  4/1990  Davies
...........204/152 and 5,062,940  11/1991  Dacies........204/228--

Title page, item [57], Abstract, "source(12) should read --source (12)--
                                 "cell(18) should read --cell (18)--.
                                 "circuit(120)." should read --circuit (20)--
Column 12 line 25, "0.06" should read --0.06--

Signed and Sealed this

Ninth Day of May, 1995

*Attest:*

BRUCE LEHMAN

*Attesting Officer*          *Commissioner of Patents and Trademarks*